Sept. 11, 1928.
J. A. BROOKS
1,684,306
CAR SEAT
Filed March 31, 1927
3 Sheets-Sheet 1
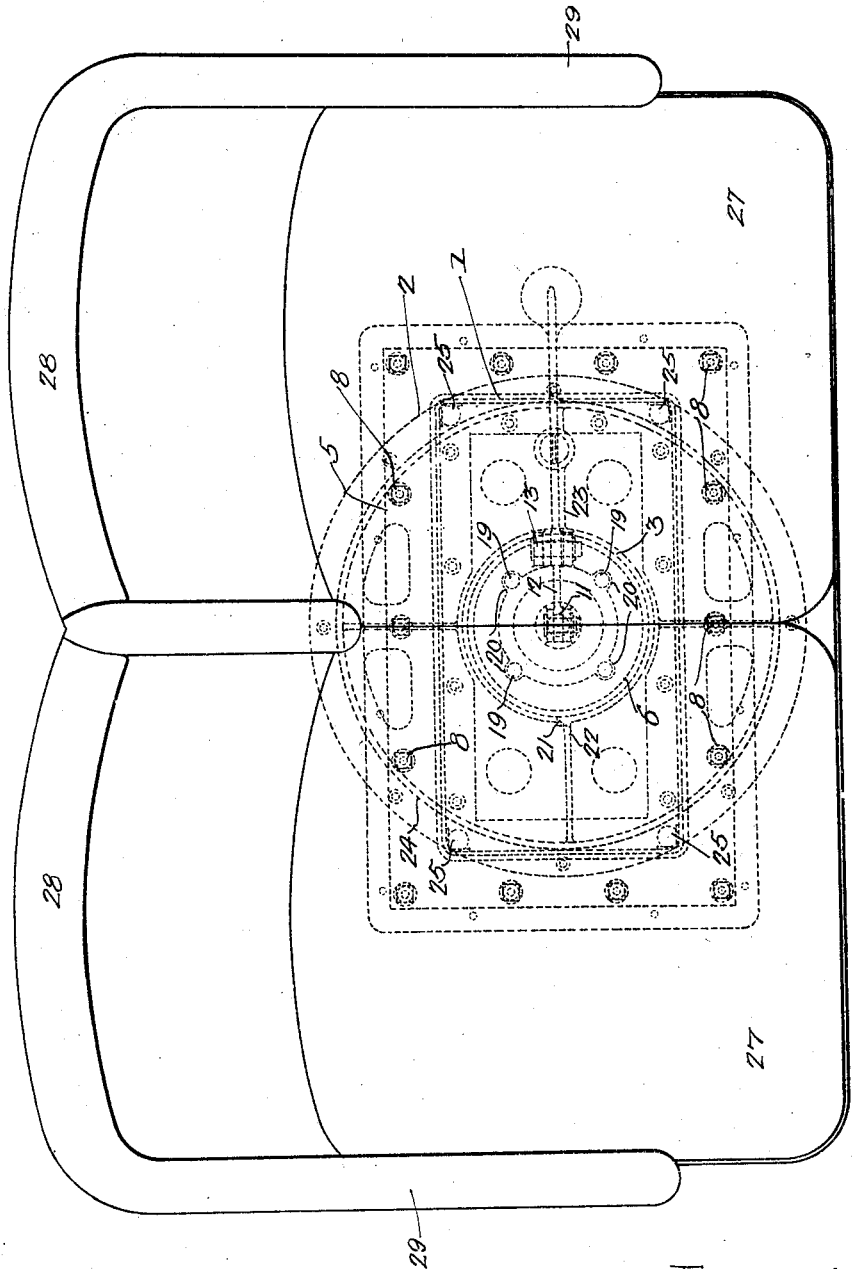
Inventor:-
James A. Brooks
by his Attorneys,
Howson & Howson Sept. 11, 1928.
J. A. BROOKS
CAR SEAT
Filed March 31, 1927
1,684,306
3 Sheets-Sheet 2
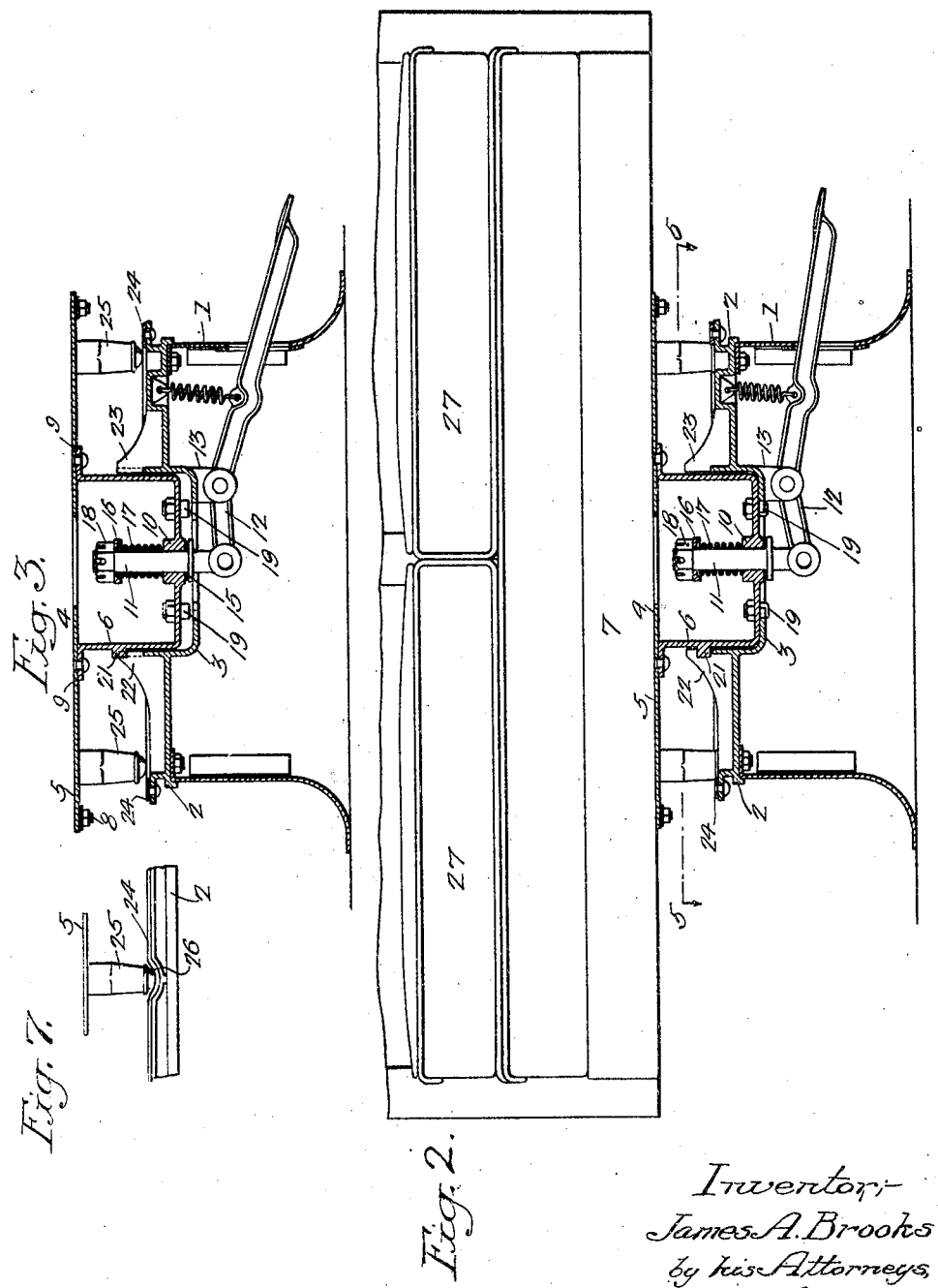

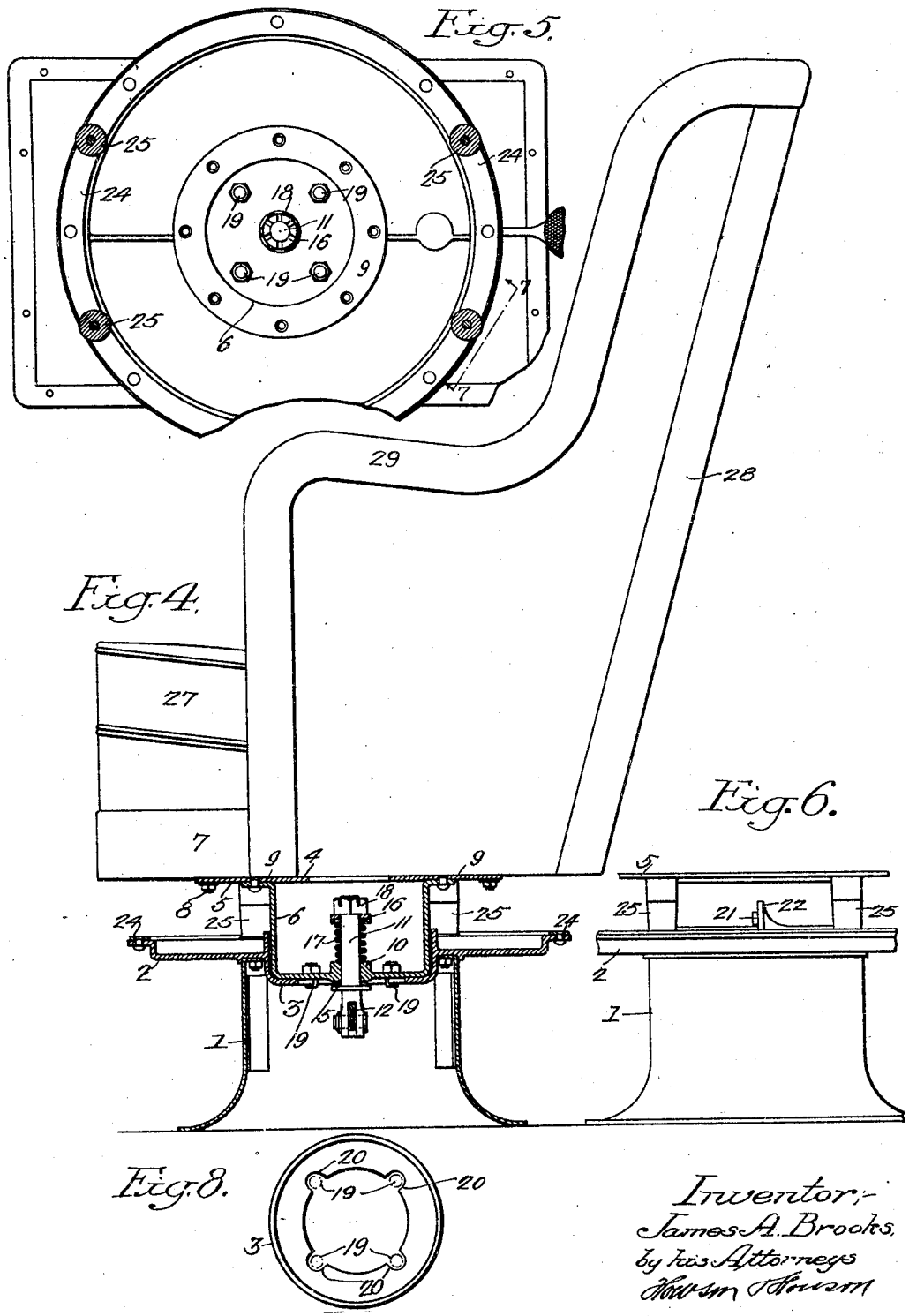

Patented Sept. 11, 1928.

1,684,306

UNITED STATES PATENT OFFICE.

JAMES A. BROOKS, OF KIRKLYN, PENNSYLVANIA, ASSIGNOR TO THE J. G. BRILL COMPANY, OF PHILADELPHIA, PENNSYLVANIA, A CORPORATION OF PENNSYLVANIA.

CAR SEAT.

Application filed March 31, 1927. Serial No. 179,857.

The object of this invention is to provide a double seat for passenger cars that can be rotated on a pedestal, so that the seat can be faced towards either end of the car.

The seat is designed with an inclined back, and the seat section projects beyond the side arms. By this construction the seats can be arranged at the standard distance apart, and one seat can be turned without interfering with an adjoining seat.

In the accompanying drawings:

Fig. 1 is a plan view of a car seat embodying my improvements;

Fig. 2 is a front view of the seat, with the upper portion broken away, and showing the base in section;

Fig. 3 is a view of the base portion similar to Fig. 2, showing the seat raised and in position to be turned;

Fig. 4 is a side view of the seat, showing the base in section;

Fig. 5 is a sectional plan view on the line 5—5, Fig. 2;

Fig. 6 is a side view of the base, showing one of the stops;

Fig. 7 is a sectional view on the line 7—7, Fig. 5; and

Fig. 8 is a detached view of the platform.

The base 1 is in the form of a hollow pedestal, on which is mounted a platform 2 secured to an internal flange on the base by bolts or other fastening means. The centre of the platform is depressed, as at 3, forming the centre bearing for the centre plate 4 which is secured to the seat. This centre plate is made in two sections 5 and 6 in the present instance, which are secured together by rivets as shown in Figs. 2 and 4.

The section 5 is a flat plate which extends beyond the section 6 and is secured to the seat structure 7 by bolts 8 or other fastenings.

The section 6 is cup-shaped and is flanged at the upper edge 9, the flange being secured to the section 5 as above described.

The section 6 of the centre plate 4 fits the depressed portion 3 of the platform.

Mounted in a bearing 10 in the base of the section 6 is a spindle 11, which is connected loosely to one arm of a lever 12 pivoted to lugs 13 depending from the underside of the platform 2. The other arm of the lever 12 extends through a slot in the pedestal 1 and is shaped to receive the foot of an operator. The long arm of the lever is held in the raised position by a spring 14 which is attached to the long arm and to a lug on the underside of the platform, Fig. 2.

On the spindle 11 is a collar which is located under the centre plate 4, and between the collar and the plate is a washer 15 of fibre, leather, or other suitable material. Located on the spindle 11, between the bearing 10 and a spring seat 16, is a coiled spring 17. The spring seat rests against a nut 18 on the spindle. This spring yieldingly holds the centre plate onto the platform.

On the centre plate 4 in the present instance are four pins 19 which rest in notches 20 in the platform, when the centre plate is seated, and lock the centre plate from turning on the platform.

In order to limit the movement of the centre plate and the seat structure carried thereby, a lug 21 is formed on the centre plate which comes in contact with either one of the two stops 22 and 23 on the platform. When the lug is in contact with either stop, the pins 19 are in alignment with their notches 20.

The platform 2 is circular as shown in Fig. 1, and on the platform is an annular rail 24 secured thereto by rivets in the present instance.

Projecting from the section 5 of the centre plate 4 are feet 25 which rest on the rail when the seat is turned. The rail and the platform are depressed at 26 to form pockets for the rounded ends of the feet when the seat is lowered, as shown in Figs. 2 and 7. These feet support the seat structure some distance from the centre of rotation, making a very rigid rotatable seat.

The seat structure 7 has a seat cushion 27, an inclined back 28, and side arms 29, the seat cushion extending beyond the side arms as shown in Fig. 4. By this construction the seats can be arranged comparatively close together, yet allowing one seat to be turned without interfering with an adjoining seat or seats. By inclining the back, a very comfortable seat is provided.

I claim:—

1. The combination in a car seat, of a pedestal; a platform secured thereto and having a depressed portion forming a centre bearing and having an annular rail depressed at certain points; a centre plate having a portion extending into the centre bearing and resting thereon; legs on the centre bearing arranged to travel on the annular rail and to normally rest in the depressed portions;

means for raising the centre plate to allow it to be turned; and a seat structure secured to the centre plate.

2. The combination in a car seat, of a pedestal; a platform secured thereto and having a depressed portion forming a centre bearing and having an annular rail depressed at certain points; a centre plate having a portion extending into the centre bearing and resting thereon; legs on the centre bearing arranged to travel on the annular rail and to normally rest in the depressed portions; means for raising the centre plate to allow it to be turned; a seat structure secured to the centre plate; and stops to limit the movement of the seat structures when turned in either direction.

3. The combination in a car seat, of a pedestal; a platform thereon having a depressed centre bearing and an annular track; a centre plate having a portion fitting the centre bearing of the platform and having legs arranged to travel on the track, said track having depressions to receive the ends of the legs; a spindle extending through a bearing in the centre plate; a lever for actuating the spindle, said spindle having a collar arranged to engage the centre plate; and pins on the centre plate, the platform being recessed to receive the pins.

4. The combination in a car seat, of a pedestal; a platform thereon having a depressed centre bearing and an annular track; a centre plate having a portion fitting the centre bearing of the platform and having legs arranged to travel on the track, said track having depressions to receive the ends of the legs; a spindle extending through a bearing in the centre plate; a lever for actuating the spindle, said spindle having a collar arranged to engage the centre plate; pins on the centre plate, the platform being recessed to receive the pins; a spring on the spindle between the centre plate bearing and a spring seat on the spindle; and a seat structure carried by the centre plate.

5. The combination in a car seat, of a pedestal; a platform thereon having depressed centre bearing notches formed in the depression and having stops thereon and an annular rail; a centre plate having a portion extending into the centre bearing, said portion having a bearing; a spindle extending through the bearing and having a collar under the bearing; a spring on the spindle between the bearing and a spring seat; an operating lever pivoted to the platform, one arm of said lever being connected to the spindle, the other arm of the lever extending outside of the pedestal in the form of a treddle; a spring connecting the lever with the platform; pins on the centre plate arranged to enter the notches in the platform; legs on the centre plate, the lower ends of the legs being rounded and arranged to travel on the annular rail of the platform, said rail having depressions to receive the legs when the centre plate is lowered; a lug on the centre plate arranged to engage the stops on the platform; and a seat structure carried by the centre plate.

JAMES A. BROOKS.